United States Patent
Lee et al.

(10) Patent No.: US 7,903,207 B2
(45) Date of Patent: Mar. 8, 2011

(54) DISPLAY SUBSTRATE COMPRISING COLOR FILTER LAYERS FORMED IN DISPLAY AND PERIPHERAL REGIONS

(75) Inventors: Back-Won Lee, Cheonan-si (KR); Jeong-Il Kim, Gwangyeock-si (KR); Hong-Woo Lee, Cheongju-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 904 days.

(21) Appl. No.: 11/210,280

(22) Filed: Aug. 23, 2005

(65) Prior Publication Data

US 2006/0061711 A1 Mar. 23, 2006

(30) Foreign Application Priority Data

Aug. 24, 2004 (KR) .......................... 10-2004-0066634
Jun. 28, 2005 (KR) .......................... 10-2005-0056212

(51) Int. Cl.
*G02F 1/1335* (2006.01)
(52) U.S. Cl. .......................... 349/106; 349/138; 349/153

(58) Field of Classification Search .................. 349/106, 349/138, 43, 110, 153, 149, 151, 152
See application file for complete search history.

(56) References Cited

U.S. PATENT DOCUMENTS

| 6,784,457 | B2 * | 8/2004 | Yamazaki et al. | 257/72 |
| 7,180,559 | B2 * | 2/2007 | Chang et al. | 349/106 |
| 7,394,510 | B2 * | 7/2008 | Oh et al. | 349/106 |
| 2003/0137621 | A1 * | 7/2003 | Zhang et al. | 349/106 |

FOREIGN PATENT DOCUMENTS

JP 1998-153797 6/1998

* cited by examiner

*Primary Examiner* — Thoi V Duong
(74) *Attorney, Agent, or Firm* — F. Chau & Associates, LLC

(57) ABSTRACT

A display substrate comprises a base substrate divided into a display region and a peripheral region surrounding the display region, wherein an image is displayed in the display region, a pixel part formed in the display region of the base substrate, a first color filter layer formed on the base substrate including the pixel part, wherein the first color filter layer is formed in the display region, and a second color filter layer formed in the peripheral region of the base substrate.

8 Claims, 17 Drawing Sheets

DISPLAY SUBSTRATE COMPRISING COLOR FILTER LAYERS FORMED IN DISPLAY AND PERIPHERAL REGIONS

CROSS-REFERENCE TO RELATED APPLICATIONS

This application claims priority to Korean Patent Application No. 2004-66634, filed on Aug. 24, 2004, and Korean Patent Application No. 2005-56212, filed on Jun. 28, 2005, the disclosures of which are incorporated herein by reference in their entireties.

BACKGROUND OF THE INVENTION

1. Technical Field

The present disclosure relates to a display substrate, a method of manufacturing the display substrate and a liquid crystal display (LCD) device having the display substrate, and more particularly to a display substrate capable of improving an image display quality, a method of manufacturing the display substrate and a liquid crystal display (LCD) device having the display substrate.

2. Discussion of the Related Art

An LCD device includes an LCD panel and a backlight assembly. The LCD panel displays an image, and the backlight assembly provides the LCD panel with light.

The LCD panel includes a lower substrate, an upper substrate and a liquid crystal layer. The lower substrate includes a plurality of pixel parts. The upper substrate is combined with the lower substrate. The liquid crystal layer is interposed between the lower and upper substrates.

The lower substrate further includes a plurality of pixel electrodes formed on the pixel parts. The upper substrate includes a common electrode and a plurality of color filters. A common voltage is applied to the common electrode. Each of the color filters displays a predetermined color using the light received from the backlight assembly. The color filters correspond to the pixel parts. When the lower substrate is combined with the upper substrate, the lower substrate may be misaligned with the upper substrate.

To prevent the misalignment between the lower and upper substrates, color filters can be formed on the lower substrate. When the color filters are formed on the lower substrate, the lower substrate corresponding to a display region has a different thickness from the lower substrate corresponding to a peripheral region that surrounds the display region. Therefore, the lower substrate corresponding to the display region has a different light transmittance from the lower substrate corresponding to the peripheral region. Thus, a stripe line is formed along an interface between the display region and the peripheral region.

SUMMARY OF THE INVENTION

Embodiments of the present invention provide a display substrate capable of improving an image display quality, a method of manufacturing the above-mentioned display substrate, and a liquid crystal display (LCD) device having the above-mentioned display substrate.

A display substrate according to an embodiment of the present invention includes a base substrate, a pixel part, a first color filter layer and a second color filter layer.

The base substrate is divided into a display region and a peripheral region surrounding the display region. An image is displayed in the display region. The pixel part is on the base substrate corresponding to the display region. The first color filter layer is on the base substrate having the pixel part. The first color filter layer is in the display region. The second color filter layer is on the base substrate in the peripheral region.

A display substrate according to an embodiment of the present invention includes a substrate, a thin film transistor, a first color filter layer, a second color filter layer, an organic layer and a pixel electrode.

The substrate is divided into a display region and a peripheral region that surrounds the display region. The image is displayed in the display region. The thin film transistor is in the display region of the substrate. The first color filter layer is in the display region of the substrate having the thin film transistor. The second color filter layer is in the peripheral region of the substrate. The organic layer is in the display region and the peripheral region to cover the first and second color filters. The pixel electrode is on the organic layer in an area corresponding to the first color filter layer. The pixel electrode is electrically connected to the thin film transistor.

A method of manufacturing a display substrate according to an embodiment of the present invention is provided as follows. A pixel part is formed in a display region of a base substrate. A color layer is formed on the base substrate having the pixel part. The color layer is patterned to form a first color filter layer in the display region and at the same time, the color layer is patterned to form a second color filter layer corresponding to the first color filter layer in a peripheral region that surrounds the display region.

A liquid crystal display device according to an embodiment of the present invention includes a lower substrate, an upper substrate and a liquid crystal layer.

The lower substrate includes a first base substrate, a first color filter layer and a second color filter layer. The first base substrate is divided into a display region and a peripheral region that surrounds the display region. An image is displayed in the display region. The first color filter layer is in the display region of the first base substrate. The second color filter layer is in the peripheral region of the first base substrate. The upper substrate includes a second base substrate corresponding to the first base substrate and a common electrode on the second base substrate. The liquid crystal layer is interposed between the upper substrate and the lower substrate.

According to embodiments of the present invention, a color filter layer is formed on a display region and a peripheral region of a lower substrate to reduce the thickness difference between the display region and the peripheral region of the lower substrate. As a result, a difference of light transmittance between the display region and the peripheral region is decreased, thereby preventing a stripe line. Therefore, the image display quality is improved.

BRIEF DESCRIPTION OF THE DRAWINGS

Preferred embodiments of the present disclosure can be understood in more detail from the following description taken in conjunction with the accompanying drawings in which.

DETAILED DESCRIPTION OF THE EMBODIMENTS

Preferred embodiments of the present invention will be described below in more detail with reference to the accompanying drawings. The present invention may be embodied in many different forms and should not be construed as limited to the embodiments set forth herein.

Figure 1:
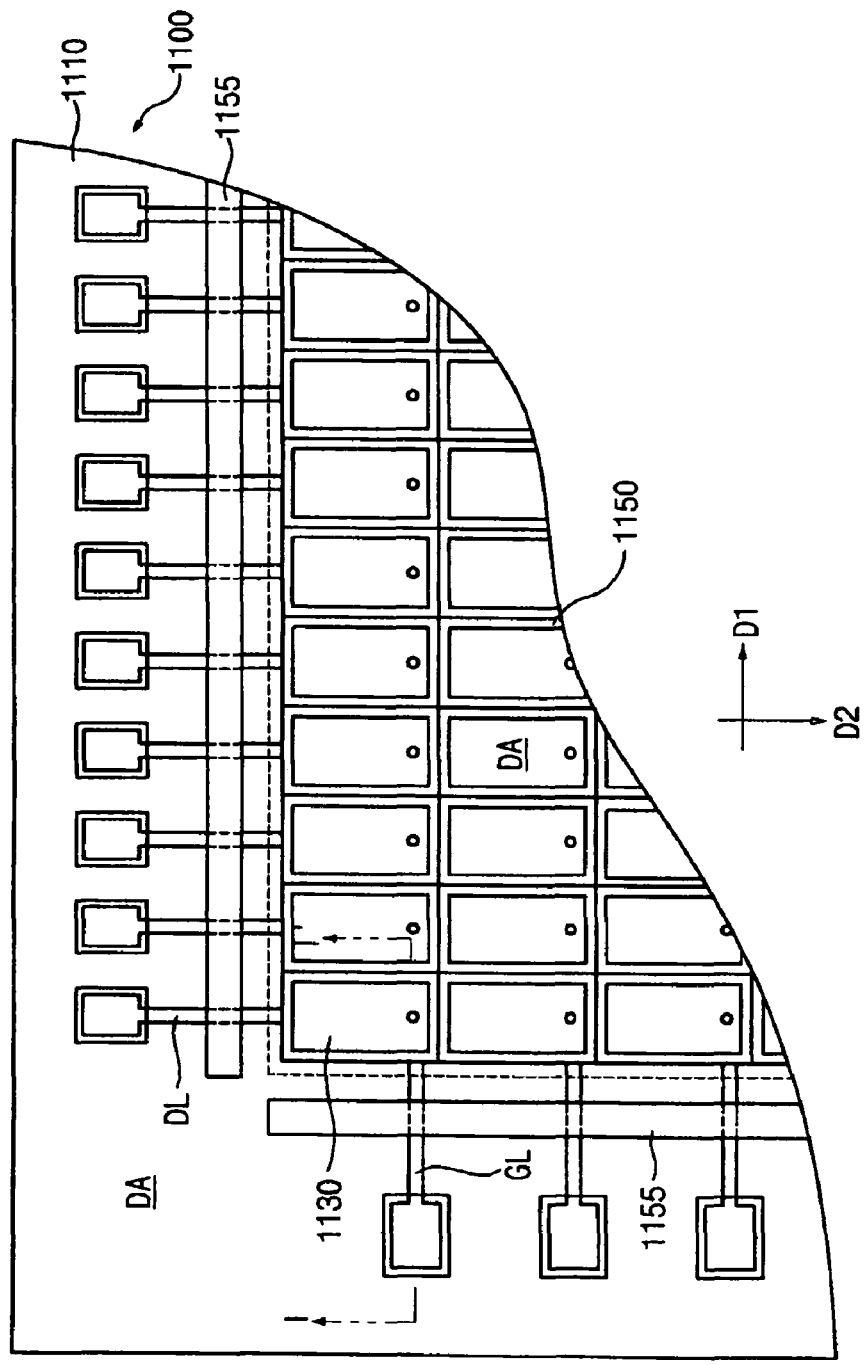
FIG. 1 is a plan view showing a lower substrate in accordance with an embodiment of the present invention.
Figure 2:
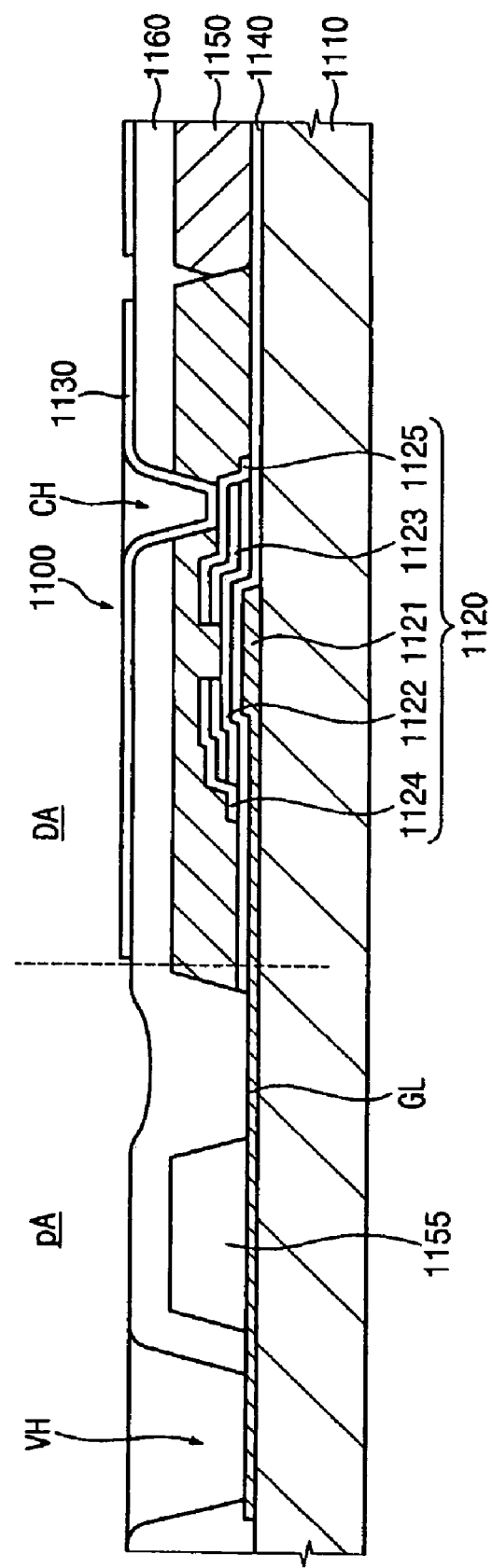
FIG. 2 is a cross-sectional view taken along the line I-I' shown in FIG. 1.

FIG. 1 is a plan view showing a lower substrate in accordance with an embodiment of the present invention. FIG. 2 is a cross-sectional view taken along the line I-I' shown in FIG. 1.

Referring to FIGS. 1 and 2, the lower substrate 1100 includes a first base substrate 1110, a gate line GL, a data line DL, a thin film transistor (TFT) 1120, a pixel electrode 1130, a first color filter layer 1150, a second color filter layer 1155 and an organic layer 1160.

The first base substrate 1110 is divided into a display region DA and a peripheral region PA surrounding the display region DA. An image is displayed in the display region DA, whereas the image is not displayed in the peripheral region PA. The first base substrate 1110 includes a transparent material. Examples of the transparent material include glass, quartz, and plastic.

The gate line GL is formed on the first base substrate 1110. In FIG. 1, the lower substrate 1100 includes a plurality of the gate lines GL. The gate lines GL are extended in a first direction D1, and arranged in a second direction D2 that crosses the first direction D1. For example, when a resolution of the lower substrate 1100 is about 1024×768, about 768 gate lines are arranged in the second direction D2.

The data line DL is formed on the first base substrate 1110. In FIG. 1, the lower substrate 1100 includes a plurality of the data lines DL. The data lines DL are extended in the second direction D2, and arranged in the first direction D1. For example when the resolution of the lower substrate 1100 is about 1024×768, about 1024×3 data lines are arranged in the first direction D1.

Figure 3:
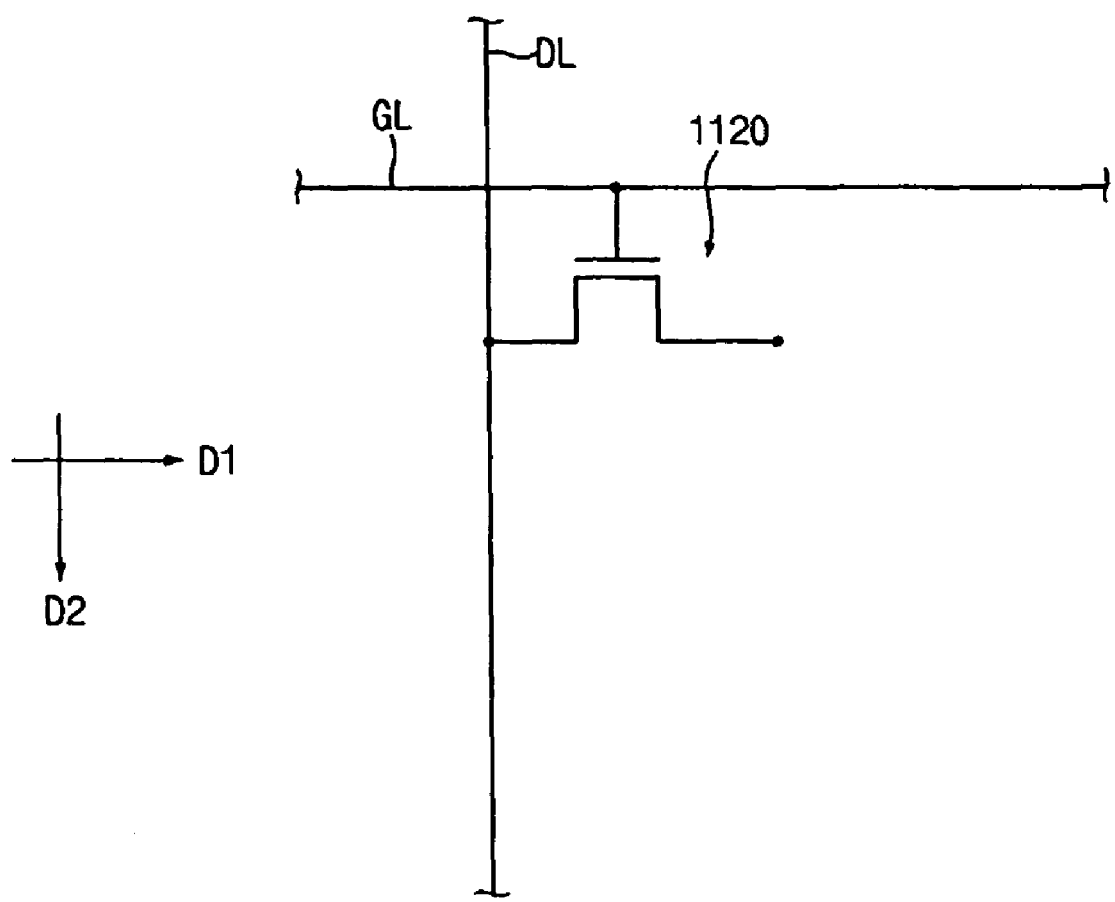
FIG. 3 is a circuit diagram showing a thin film transistor (TFT) shown in FIG. 2.

FIG. 3 is a circuit diagram showing a thin film transistor (TFT) shown in FIG. 2.

Referring to FIGS. 2 and 3, the TFT 1120 is formed on the first base substrate 1110, and electrically connected to one of the gate lines GL and one of the data lines DL.

In FIGS. 1 to 3, a plurality of the TFTs 1120 are formed in the display region DA. For example, when the resolution of the lower substrate 1100 is about 1024×768, about 1024×768×3 TFTs 1120 are formed on the first base substrate 1110.

Each of the TFTs 1120 includes a gate electrode 1121, an active layer 1122, an ohmic contact layer 1123, a source electrode 1124 and a drain electrode 1125.

The gate electrode 1121 is electrically connected to the gate line GL, and receives a gate signal. The gate electrode 1121 is formed from a same layer as the gate lines GL.

A gate insulating layer 1140 is formed on the first base substrate 1110 on which the gate electrode 1121 is formed. The gate insulating layer 1140 protects the gate electrode 1121 and the gate lines GL.

The active layer 1122 and the ohmic contact layer 1123 are sequentially formed in the display region DA of the gate insulating layer 1140, so that the ohmic contact layer 1123 is formed on the active layer 1122. The active layer 1122 and the ohmic contact layer 1123 correspond to the gate electrode 1121. A central portion of the ohmic contact layer 1123 is removed so that the active layer 1122 is partially exposed through an opening of the ohmic contact layer 1123. The exposed active layer 1122 functions as a channel region between the source electrode 1124 and the drain electrode 1125.

The source electrode 1124 and the drain electrode 1125 are disposed on the ohmic contact layer 1123. The source electrode 1124 and the drain electrode 1125 are positioned opposite to each other with respect to the channel region. The source electrode 1124 is electrically connected to one of the data lines DL, and receives a data signal.

The pixel electrode 1130 is electrically connected to each of the TFTs 1120 and formed on the first color filter layer 1150. The pixel electrode 1130 includes a transparent conductive material. Examples of the transparent conductive material include indium tin oxide (ITO), tin oxide (TO), indium zinc oxide (IZO), zinc oxide (ZO), and indium tin zinc oxide (ITZO).

The first color filter layer 1150 corresponds to the drain electrode 1125 of each of the TFTs 1120. The first color filter layer 1150 includes a red color filter that transmits red light, a green color filter that transmits green light, and a blue color filter that transmits blue light.

The first color filter layer 1150 is formed in only the display region DA of the lower substrate 1100 so that a stepped portion is formed on an interface between the display region DA and the peripheral region PA.

The second color filter layer 1155 is in the peripheral region PA to compensate for the stepped portion on the interface between the display region DA and the peripheral region PA. According to an embodiment of the present invention, the second color filter layer 1155 includes substantially the same material as the first color filter layer 1150. The second color filter layer 1155 is formed through substantially the same process as for the first color filter layer 1150. According to an embodiment of the present invention, as shown, for example, in FIGS. 1 to 3, the second color filter layer 1155 is simultaneously formed with the first color filter layer 1150.

The second color filter layer 1155 is spaced apart from the first color filter layer 1150, and includes, for example, a rod shape.

An organic layer 1160 is formed on the first base substrate 1110 to cover the first and second color filter layers 1150 and 1155, and planarizes an upper surface of the lower substrate 1100. The first color filter layer 1150 and the organic layer 1160 are partially removed to form a contact hole CH through which the drain electrode 1125 is partially exposed. The pixel electrode 1130 is electrically connected to the drain electrode 1125 through the contact hole CH.

The organic layer 1160 further includes via holes VH through which end portions of the gate lines GL and the data lines DL are exposed. The via holes VH are formed by partially removing the organic layer 1160.

Figure 4:
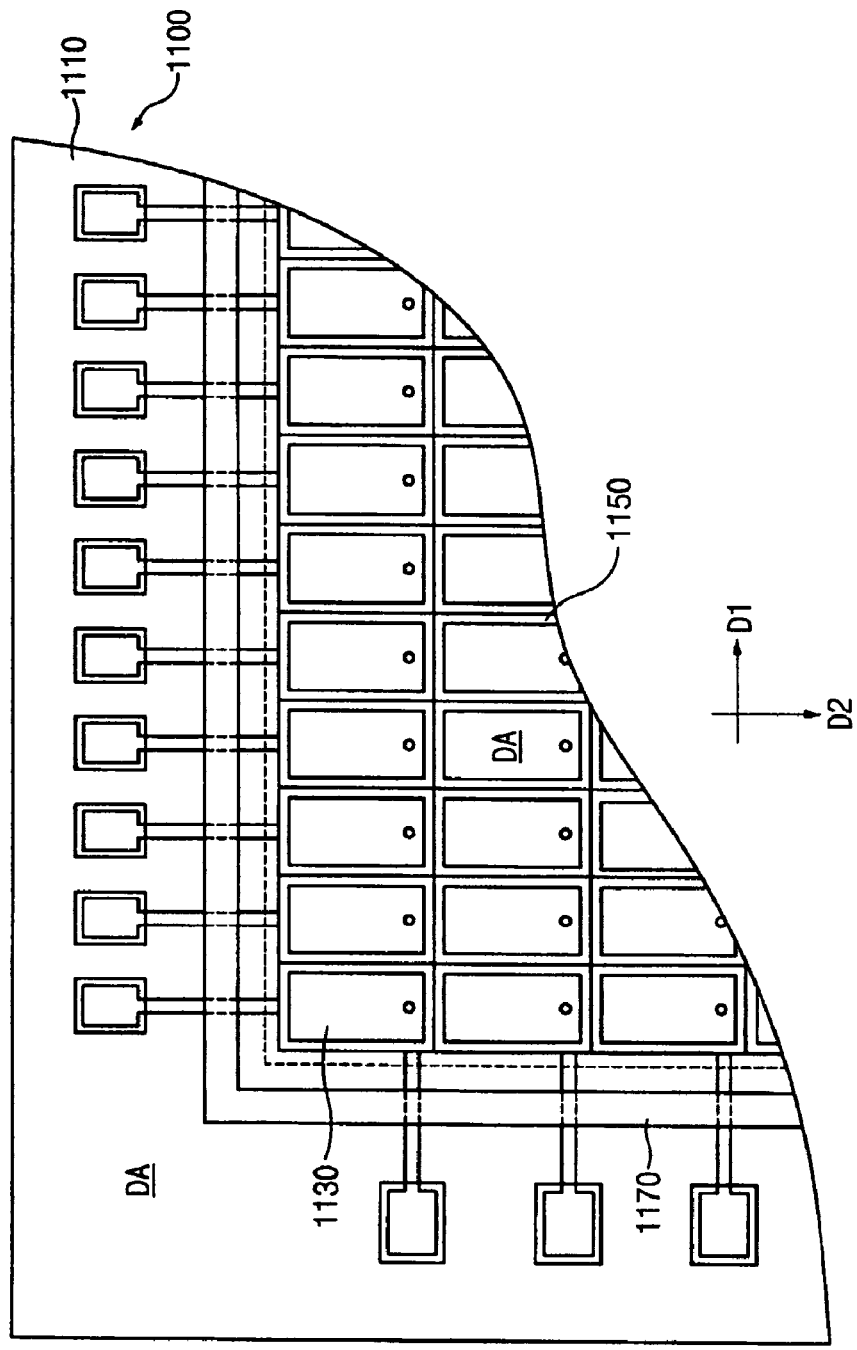
FIG. 4 is a plan view showing a second color filter in accordance with an embodiment of the present invention.

FIG. 4 is a plan view showing a second color filter on the lower substrate 1100 in accordance with another embodiment of the present invention.

Referring to FIG. 4, a second color filter layer 1170 is formed in a peripheral region PA, and surrounds a display region DA. A distance between the first color filter layer 1150 and the second color filter layer 1170 is adjusted to compensate for a stepped portion on an interface between the display region DA and the peripheral region PA. According to an embodiment of the present invention, the second color filter layer 1170 may eliminate the stepped portion.

Figure 5:
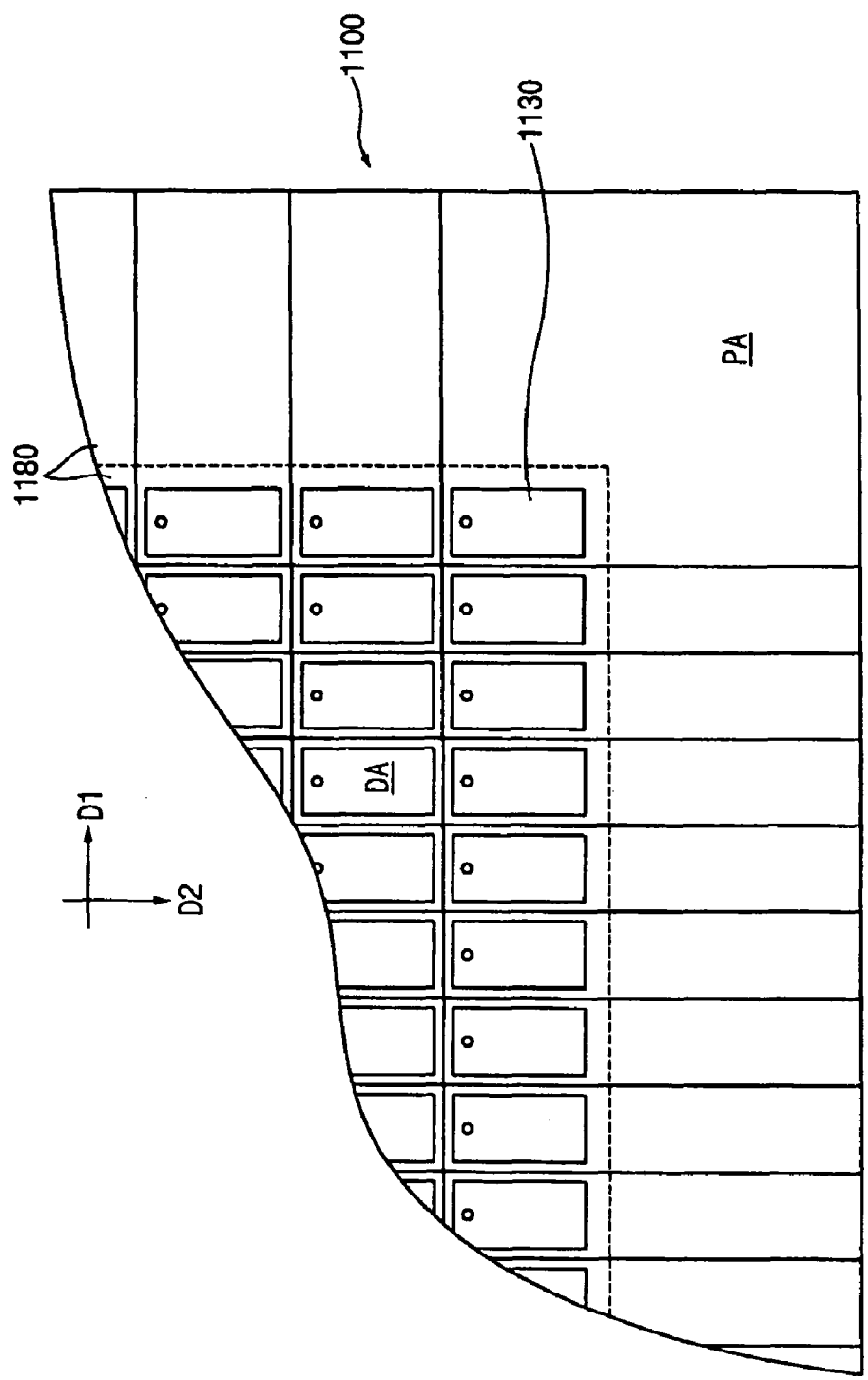
FIG. 5 is a plan view showing a dummy color filter in accordance with an embodiment of the present invention.

FIG. 5 is a plan view showing a dummy color filter according to an embodiment of the present invention.

Referring to FIG. 5, a first color filter layer 1180 is formed on the display region DA and the peripheral region PA. The first color filter layer 1180 is formed on the entire display region DA and the entire peripheral region PA. Alternatively, the first color filter layer 1180 may be formed on the entire display region DA and a portion of the peripheral region PA. When the first color filter layer 1180 is formed on the entire peripheral region PA, a second color filter layer 1155 (shown in FIG. 1) may be omitted. That is, the second color filter layer 1155 (shown in FIG. 1) may be integrally formed with the first color filter layer 1180. The first color filter layer 1180 includes openings through which end portions of gate lines GL and data lines DL are exposed.

The first color filter layer 1180 is extended from the display region DA toward the peripheral region PA so that a stepped portion between the display region DA and the peripheral region PA is prevented from forming.

Figure 6:
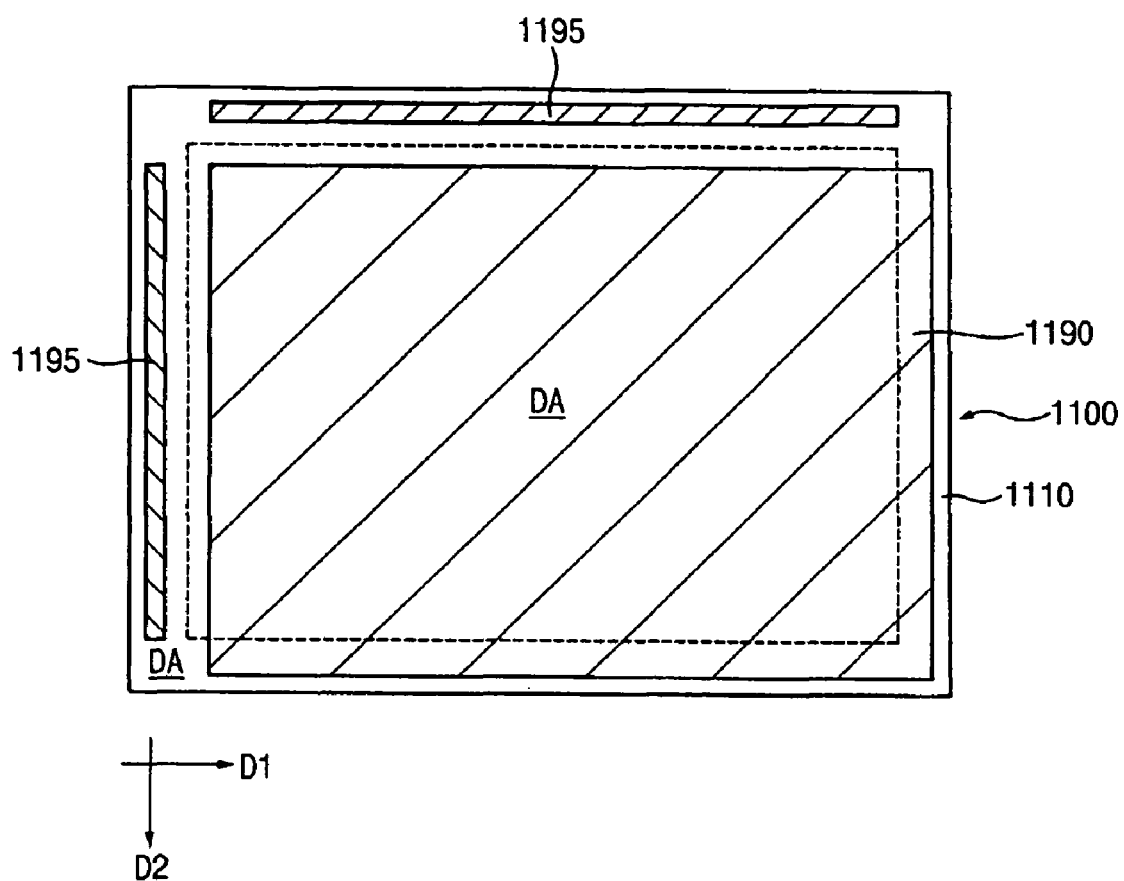
FIG. 6 is a plan view showing a dummy color filter in accordance with an embodiment of the present invention.

FIG. 6 is a plan view showing a dummy color filter in accordance with another embodiment of the present invention.

Referring to FIG. 6, a first color filter layer 1190 is formed on the entire display region DA and a portion of the peripheral region PA.

A second color filter layer 1195 is formed in the peripheral region PA, and includes, for example, a rod shape. The second color filter layer 1195 may include at least two second color filter portions spaced apart from each other. The second color filter layer 1195 is formed on end portions of the gate lines GL and the data lines DL.

In FIG. 6, two sides of the first color filter layer 1190, which correspond to the second color filter layer 1195, are formed in the display region DA. Remaining two sides of the first color filter layer 1190, which are opposite to the second color filter layer 1195, are formed in the peripheral region PA. That is, a portion of the first color filter layer 1190 is extended from the display region DA toward the peripheral region PA.

Figure 7:
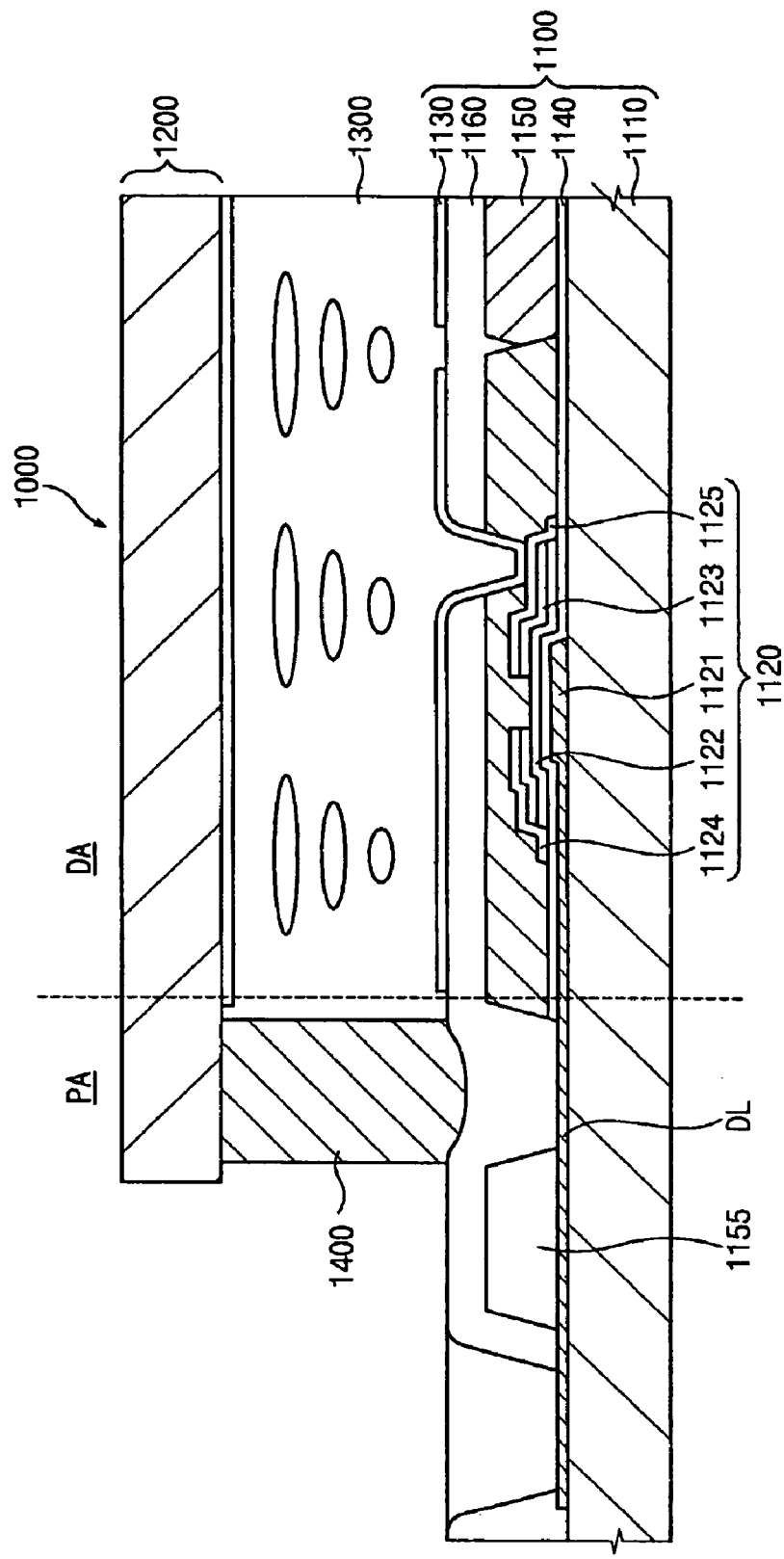
FIG. 7 is a cross-sectional view showing an LCD device in accordance with an embodiment of the present invention.

FIG. 7 is a cross-sectional view showing an LCD device in accordance with another embodiment of the present invention.

Referring to FIGS. 1 and 7, the LCD device 1000 includes a lower substrate 1100, an upper substrate 1200 and a liquid crystal layer 1300.

The lower substrate 1100 includes a first base substrate 1110, a plurality of thin film transistors (TFT) 1120, a plurality of pixel electrodes 1130, first and second color filter layers 1150 and 1155 and an organic layer 1160.

The lower substrate 1100 of FIG. 7 is the same as the lower substrate 1100 in FIG. 1.

In FIG. 7, the first color filter layer 1150 is formed in a display region DA of the first base substrate 1110. Alternatively, the first color filter layer 1150 may be extended from the display region DA toward a peripheral region PA of the first base substrate 1110 as shown in FIGS. 5 and 6.

In FIG. 7, the second color filter layer 1155 is formed in the peripheral region PA of the first base substrate 1110, and includes, for example, a rod shape. Alternatively, like the second color filter layer 1170 shown in FIG. 4, the second color filter layer may have a closed loop shape.

The upper substrate 1200 faces the lower substrate 1100. The upper substrate 1200 includes a common electrode facing the pixel electrode 1130.

A sealant 1400 is interposed between the lower substrate 1100 and the upper substrate 1200 so that the lower substrate 1100 is combined with the upper substrate 1200 to seal the liquid crystal layer 1300 between the lower substrate 1100 and the upper substrate 1200.

Figure 8:
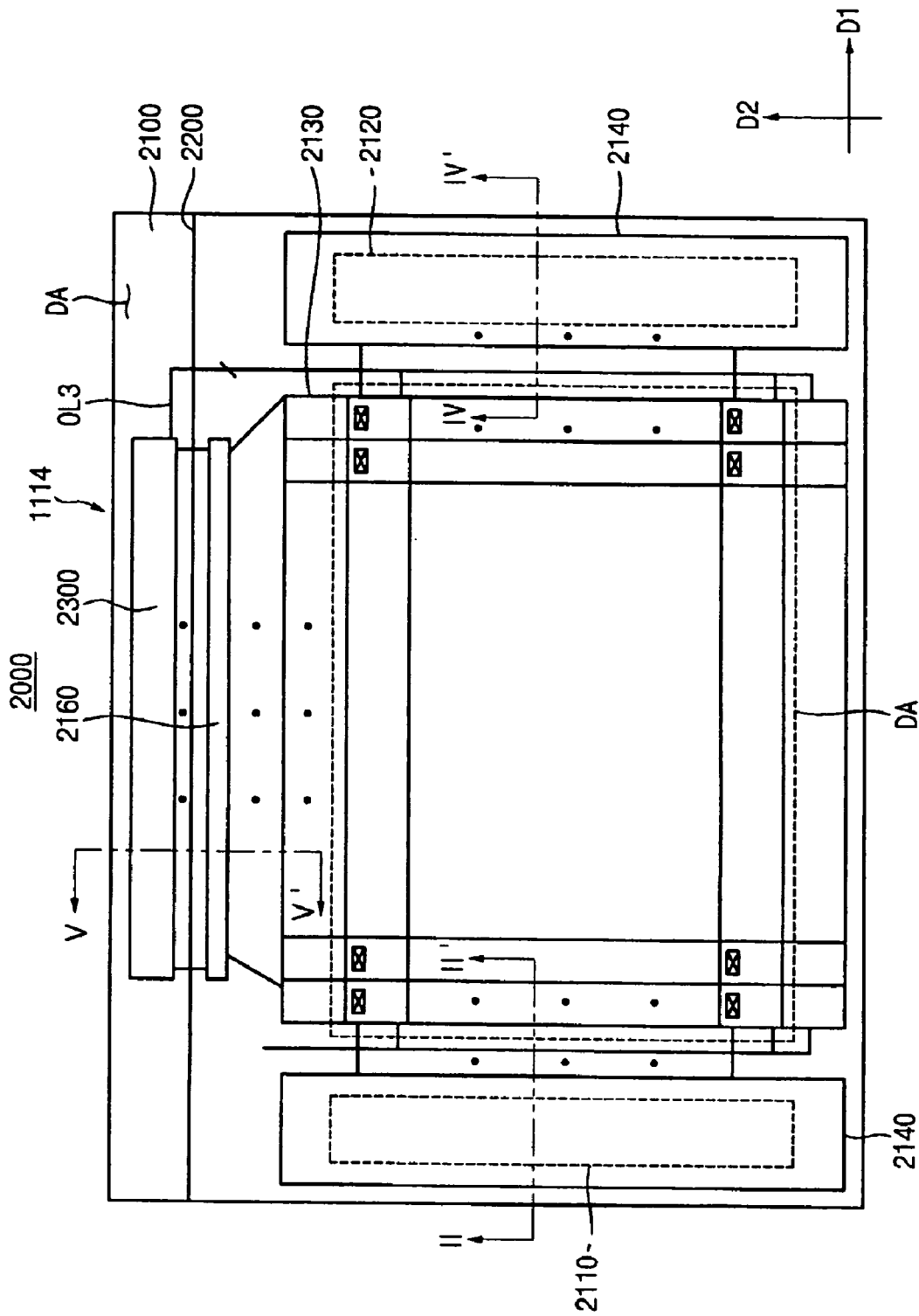
FIG. 8 is a plan view showing an LCD device in accordance with an embodiment of the present invention.
Figure 9:
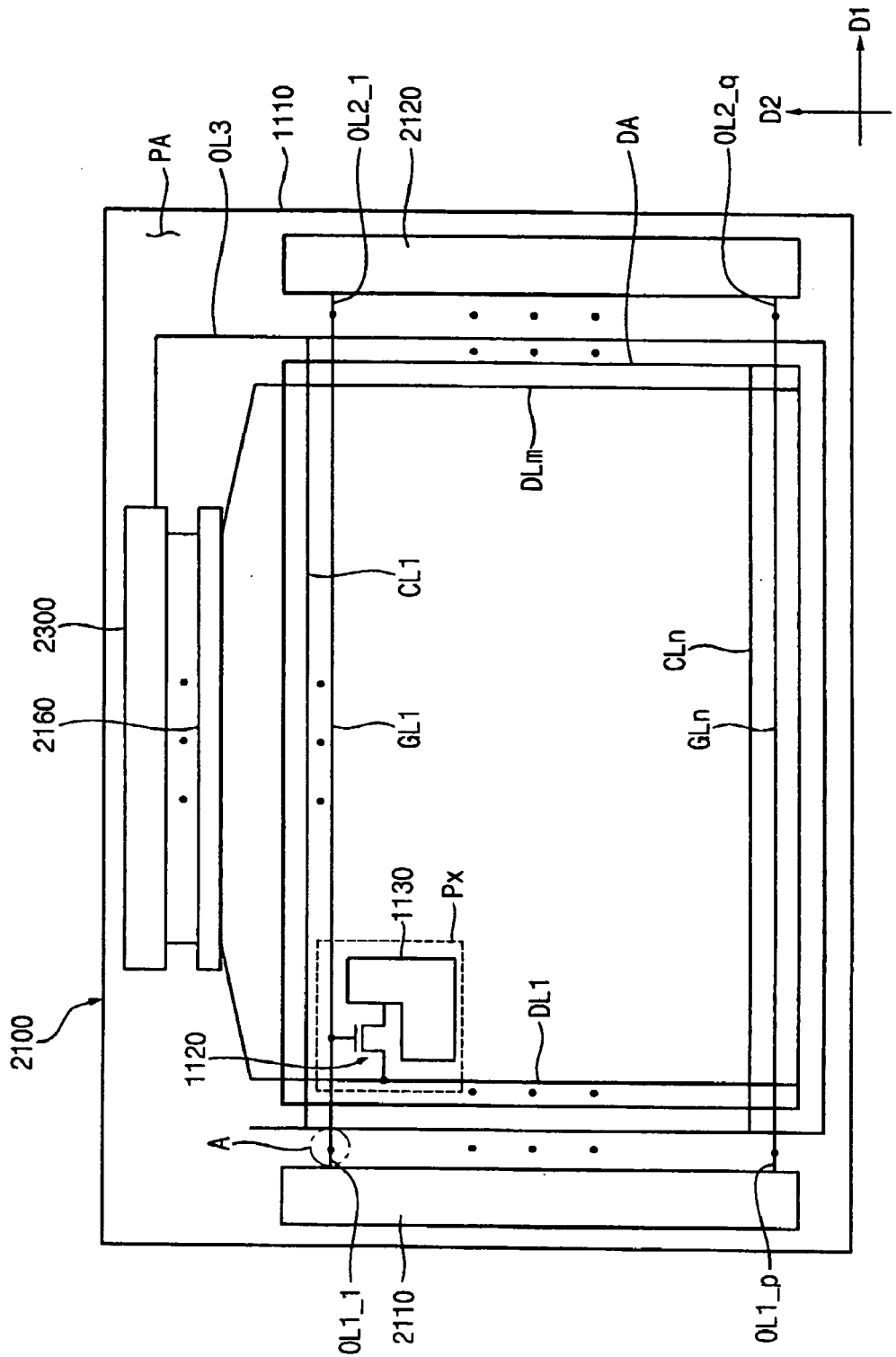
FIG. 9 is a plan view showing the lower substrate shown in FIG. 8.

FIG. 8 is a plan view showing an LCD device in accordance with another embodiment of the present invention. FIG. 9 is a plan view showing a lower substrate shown in FIG. 8.

Referring to FIGS. 8 and 9, the LCD device 2000 includes a lower substrate 2100, an upper substrate 2200 and a driving chip 2300. The upper substrate 2200 corresponds to the lower substrate 2100 to be combined with the lower substrate 2100. The driving chip 2300 is mounted on the lower substrate 2100 to output a data signal.

The lower substrate 2100 includes a first base substrate 1110 and a plurality of pixel parts Px on the first base substrate 1110.

The first base substrate 1110 is divided into the display region DA and the peripheral region PA surrounding the display region DA. An image is displayed in the display region DA, whereas the image is not displayed in the peripheral region PA. The first base substrate 1110 of FIGS. 8 and 9 is the same as the first base substrate 1110 in FIG. 1. The pixel parts Px include a plurality of gate lines GL1, . . . GLn and a plurality of data lines DL1, . . . DLm. Here, n and m are natural numbers.

The gate lines GL1, . . . GLn are extended in a first direction D1, and arranged in a second direction D2 that is substantially perpendicular to the first direction D1. The gate lines GL1, . . . GLn are electrically insulated from the data lines DL1, . . . DLm, and cross the data lines DL1, . . . DLm in the display region DA. The gate lines GL1, . . . GLn transmit gate signals.

The data lines DL1, . . . DLm are extended in the second direction D2, and arranged in the first direction D1. The data lines DL1, . . . DLm are electrically connected to the driving chip 2300 to transmit data signals.

Each of the pixel parts Px includes a TFT 1120 that is electrically connected to one of the gate lines GL1, . . . GLn and one of the data lines DL1, DLm, and a pixel electrode 1130 that is electrically connected to the TFT 1120.

The lower substrate 2100 may further include a first gate driving part 2110 in the peripheral region PA of the first base substrate 1110 to output the gate signals to the gate lines GL1, . . . GLn.

The first gate diving part 2110 outputs the gate signals to the gate lines GL1, . . . GLn based on an externally provided control signal in sequence. The first gate driving part 2110 is formed through substantially the same process as the TFT 1120. According to an embodiment of the present invention, the first gate driving part 2110 is simultaneously formed with the TFT 1120, and is formed from the same layer as the pixel parts Px in the peripheral region PA of the first base substrate 1110.

According to an embodiment of the present invention, the first gate driving part 2110 may be integrally formed with the driving chip 2300. The first gate driving part 2110 may be a chip mounted in the peripheral region PA of the first base substrate 1110. When the first gate driving part 2110 is integrally formed with the driving chip 2300, the driving chip 2300 outputs the gate signals to the gate lines GL1, . . . GLn.

Figure 10:
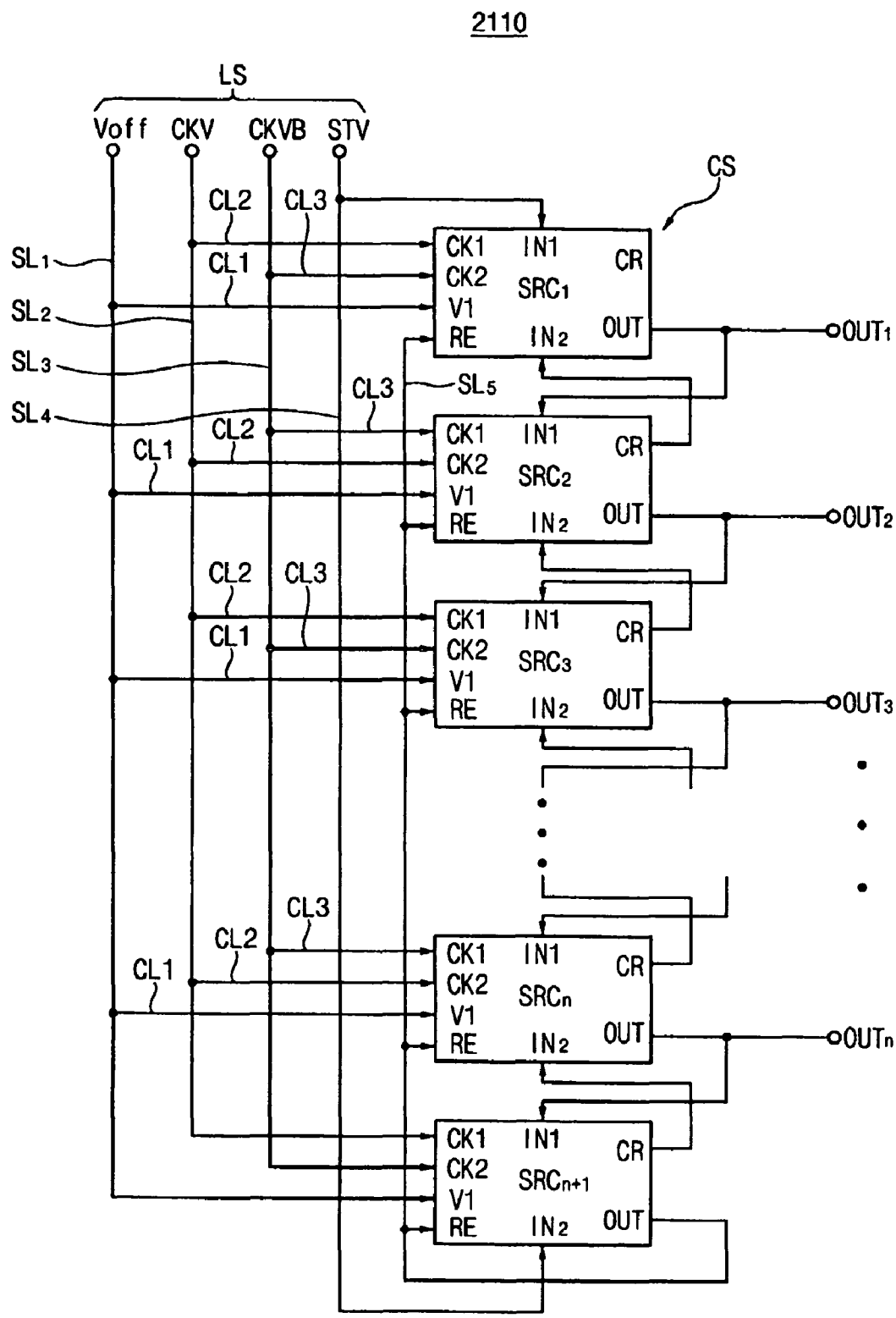
FIG. 10 is a block diagram showing a first gate driving part shown in FIG. 9.

FIG. 10 is a block diagram showing the first gate driving part 2110 shown in FIG. 9.

Referring to FIG. 10, the first gate driving part 2110 includes a circuit portion CS and an input portion LS adjacent to the circuit portion CS.

The circuit portion CS includes first to (n+1)-th stages SRC1, . . . SRCn+1 to output first to n-th gate signals OUT1, . . . OUTn to the first to n-th gate lines GL1, . . . GLn in sequence.

Each of the first to (n+1)-th stages SRC1, . . . SRCn+1 includes a first clock terminal CK1, a second clock terminal CK2, a first input terminal IN1, a second input terminal IN2, a ground voltage terminal V1, a reset terminal RE, a carry terminal CR and an output terminal OUT.

A first clock CKV is applied to the first clock terminal CK1 of odd numbered stages SRC1, SRC3, . . . SRCn+1 of the first to (n+1)-th stages SRC1, . . . SRCn+1. A second clock CKVB that has a different phase from the first clock CKV is applied to the first clock terminal CK1 of even numbered stages SRC2, SRC4, . . . SRCn of the first to (n+1)-th stages SRC1, . . . SRCn+1. The second clock CKVB is applied to the second clock terminal CK2 of the odd numbered stages SRC1, SRC3, . . . SRCn+1. The first clock CKV is applied to the second clock terminal CK2 of the even numbered stages SRC2, SRC4, . . . SRCn.

A start signal STV or a gate signal of a previous stage is applied to the first input terminal IN1 of each of the first to (n+1)-th stages SRC1, . . . SRCn+1. The start signal STV is applied to the first input terminal IN1 of the first stage SRC1 to initiate an operation of the circuit portion CS.

A carry signal of a next stage is applied to the second input terminal IN2 of each of the first to n-th stages SRC1, . . . SRCn. The (n+1)-th stage is a dummy stage to apply a carry signal to the second input terminal IN2 of the n-th stage SRCn. The start signal STV is applied to the second input terminal IN2 of the (n+1)-th stage SRCn+1.

An off voltage Voff is applied to the off voltage terminal V1 of each of the first to (n+1)-th stages SRC1, . . . SRCn+1. The (n+1)-th gate signal that is outputted from the (n+1)-th stage SRCn+1 is applied to the reset terminals RE of the first to (n+1)-th stages SRC1, . . . SRCn+1.

The first clock CKV is outputted from the carry terminal CR of the odd numbered stages SRC1, SRC3, . . . SRCn+1 and the output terminal OUT of the odd numbered stages SRC1, SRC3, . . . SRCn+1. The second clock CKVB is outputted from the carry terminal CR of the even numbered stages SRC2, SRC4, SRCn and the output terminal OUT of the even numbered stages SRC2, SRC4, . . . SRCn. Each of the first to n-th gate signals OUT1, . . . OUTn that are outputted from the output terminals OUT of the first to n-th stages SRC1, . . . SRCn is applied to the first input terminal IN1 of the next stage.

The input portion LS includes a first signal line SL1, a second signal line SL2, a third signal line SL3, a fourth signal line SL4 and a fifth signal line SL5.

The off voltage Voff is applied to the first signal line SL1. The first clock CKV is applied to the second signal line SL2. The second clock CKVB is applied to the third signal line SL3. The start signal STV is applied to the first input terminal IN1 of the first stage SRC1 and the second input terminal IN2 of the (n+1)-th stage SRCn+1 through the fourth signal line SL4. The (n+1)-th gate signal of the (n+1)-th stage SRCn+1 is applied to the reset terminals RE of each of the first to (n+1)-th stages SRC1, . . . SRCn+1 through the fifth signal line SL5.

In FIG. 10, the fifth signal line SL5 is adjacent to the circuit portion CS. The fourth signal line SL4 is adjacent to the fifth signal line SL5 in a direction away from the circuit portion CS. The third signal line SL3 is adjacent to the fourth signal line SL4 in a direction away from the fifth signal line SL5. The second signal line SL2 is adjacent to the third signal line SL3 in a direction away from the fourth signal line SL4. The first signal line SL1 is adjacent to the second signal line SL2 in a direction away from the third signal line SL3. The first signal line SL1 is closer to a side of the first base substrate 1110 (shown in FIG. 2) than the second, third, fourth and fifth signal lines SL2, SL3, SL4 and SL5.

The input portion LS may further include a first connecting line CL1, a second connecting line CL2 and a third connecting line CL3.

The first connecting line CL1 is electrically connected between the first signal line SL1 and the off voltage terminal V1 of each of the first to (n+1)-th stages SRC1, . . . SRCn+1. The second connecting line CL2 is electrically connected between the second signal line SL2 and the first clock terminal CK1 of each of the odd numbered stages SRC1, SRC3, . . . SRCn+1 of the circuit portion CS, and between the second signal line SL2 and the second clock terminal CK2 of each of the even numbered stages SRC2, SRC4, . . . SRCn of the circuit portion CS. The third connecting line CL3 is electrically connected between the third signal line SL3 and the first clock terminal CK1 of the even numbered stages SRC2, SRC4, . . . SRCn of the circuit portion CS, and between the third signal line SL3 and the second clock terminal CK2 of the odd numbered stages SRC1, SRC3, . . . SRCn+1 of the circuit portion CS.

Referring again to FIG. 9, the lower substrate 2100 may further include a second gate driving part 2120 in the peripheral region PA of the first base substrate 1110. The second gate driving part 2120 corresponds to the first gate driving part 2110. That is, the first and second gate driving parts 2110 and 2120 are adjacent to opposite sides of the display region DA, respectively.

When the second gate driving part 2120 is positioned on the opposite side of the lower substrate 2100 with respect to the first gate driving part 2110, cell gaps of a liquid crystal layer in the peripheral region PA are uniform. In addition, the second gate driving part 2120 may share a function of the first gate driving part 2110.

When the second gate driving part 2120 performs substantially the same function as the first gate driving part 2110, the second gate driving part 2120 outputs gate signals to the gate lines GL1, . . . GLn based on an externally provided control signal.

According to an embodiment of the present invention, the second gate driving part 2120 may only control the cell gap, and not output the gate signals.

The second gate driving part 2120 is formed through substantially the same process as the first gate driving part 2110. According to an embodiment of the present invention, the second gate driving part 2120 may be simultaneously formed with the first gate driving part 2110 and the TFT 1120, and is formed from the same layer as the first gate driving part 2110 in the peripheral region PA of the first base substrate 1110.

Referring to FIG. 8, the lower substrate 2100 may further include the first color filter layer 2130 and the second color filter layer 2140. The first color filter layer 2130 is formed in the display region DA of the first base substrate 1110. The second color filter layer 2140 is formed in the peripheral region PA of the first base substrate 1110.

The first color filter layer 2130 corresponds to the display region DA, and includes the red color filter, the green color filter and the blue color filter to display red, green and blue light, respectively.

The second color filter layer 2140 corresponds to the peripheral region PA, and is formed on the first and second gate driving parts 2110 and 2120. According to an embodiment of the present invention, the second color filter layer 2140 may be formed from the same layer as one of the red, green and blue color filters. Alternatively, the second color filter layer 2140 may be formed from the same layer as at least two of the red, green and blue color filters.

According to an embodiment of the present invention, the second color filter layer 2140 is formed through substantially the same process as the first color filter layer 2130, and is simultaneously formed with the first color filter layer 2130.

The second color filter layer 2130 may be formed on the entire peripheral region PA. Alternatively, the second color filter layer 2130 may be formed on the opposite sides of the display region DA, on which the first and second gate driving parts 2110 and 2120 are formed.

When the second color filter layer 2140 is formed on the opposite sides of the display region DA, the first color filter layer 2130 may be extended from the display region DA toward the peripheral region PA so that the second color filter layer 2140 may be omitted.

That is, the first color filter layer 2130 is extended from the display region DA toward the opposite sides of the first base substrate 1110 on which the driving chip 2300 is formed. The driving chip 2300 is formed on the end portions of the data lines 2130. Therefore, the first color filter layer 2130 covers the display region DA and a portion of the peripheral region PA.

Figure 11:
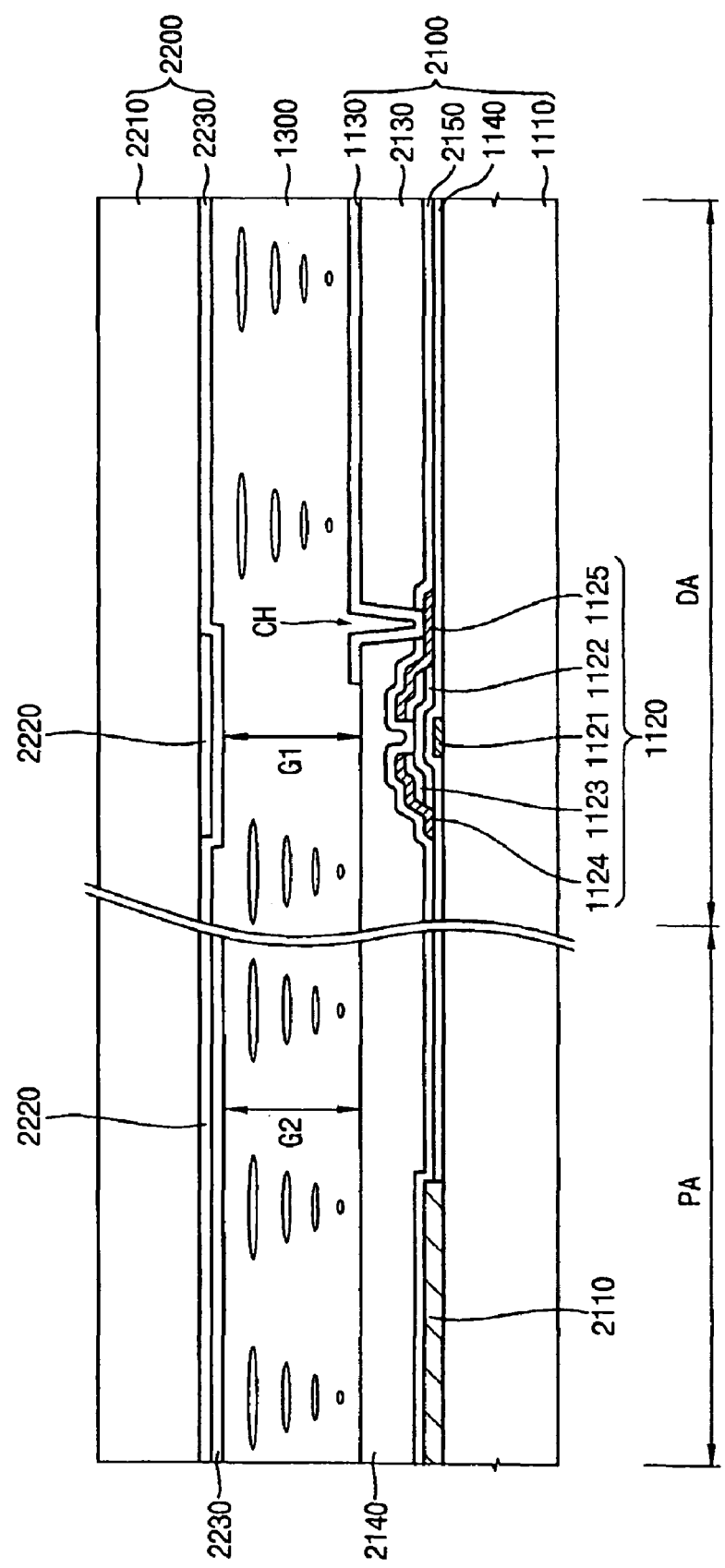
FIG. 11 is a cross-sectional view taken along the line II-II' shown in FIG. 8.

FIG. 11 is a cross-sectional view taken along the line II-II' shown in FIG. 8.

Referring to FIGS. 8 and 11, the TFT 1120 is formed in the display region DA of the first base substrate 1110. The TFT 1120 of FIGS. 8 and 11 is the same as the TFT 1120 in FIG. 2.

The lower substrate 2100 may further include a protecting layer 2150 to protect the TFT 1120 and the first gate driving part 2110. The protecting layer 2150 is formed on the first base substrate 1110 on which the TFT 1120 and the first gate driving part 2110 are formed.

The first and second color filter layers 2130 and 2140 are on the protecting layer 2150. The first color filter layer 2130 is formed in the display region DA.

The second color filter layer 2140 is formed in the peripheral region PA, and has substantially the same material as the first color filter layer 2130. The second color filter layer 2140 is formed on the first and second gate driving parts 2110 and 2120 so that the first and second gate driving 2110 and 2120 are electrically insulated from the upper substrate 2200, thereby preventing a short circuit in the peripheral region PA between the lower substrate 2100 and the upper substrate 2200.

The first and second color filter layers 2130 and 2140 have substantially the same thickness. Therefore, a difference between a cell gap of the display region DA and a cell gap of the peripheral region PA is decreased. In addition, the thickness of the lower substrate 2100 corresponding to the peripheral region PA may be increased to prevent light leakage in the peripheral region PA.

Therefore, a stripe line is prevented in the peripheral region PA so that an image display quality is improved.

The protecting layer 2150 and the first color filter layer 2130 are partially removed to form a contact hole CH through which a drain electrode 1125 of the TFT 1120 is partially exposed.

The pixel electrode 1130 is formed on the first color filter layer 2130. The pixel electrode 1130 includes a transparent conductive material. Examples of the transparent conductive material include indium tin oxide (ITO), tin oxide (TO), indium zinc oxide (IZO), zinc oxide (ZO), and indium tin zinc oxide (ITZO). The pixel electrode 1130 is electrically connected to the TFT 1120 through the contact hole CH.

The upper substrate 2200 corresponds to the lower substrate 2100. The upper substrate 2200 includes a second base substrate 2210, a black matrix 2220 and a common electrode 2230.

The second base substrate 2210 includes a transparent material to transmit light incident thereto. The second base substrate 2210 corresponds to the first base substrate 1110. The black matrix 2220 is formed on the second base substrate 2210 to block light. The black matrix 2220 corresponds to the TFT 1120 and the peripheral region PA. The common electrode 2230 is formed on the second base substrate 2210 having the black matrix 2220 to receive a common voltage. The common electrode 2230 includes a transparent conductive material. Examples of the transparent conductive material include indium tin oxide (ITO), tin oxide (TO), indium zinc oxide (IZO), zinc oxide (ZO), and indium tin zinc oxide (ITZO). The liquid crystal layer 1300 is interposed between the lower substrate 2100 and the upper substrate 2200. Liquid crystal molecules of the liquid crystal layer 1300 vary their arrangement in response to an electric field applied to the liquid crystal layer 1300, thereby changing a light transmittance of the liquid crystal layer 1300. The electric field is formed between the pixel electrode 1130 and the common electrode 2230. Therefore, the LCD device 2000 displays an image.

Figure 12:
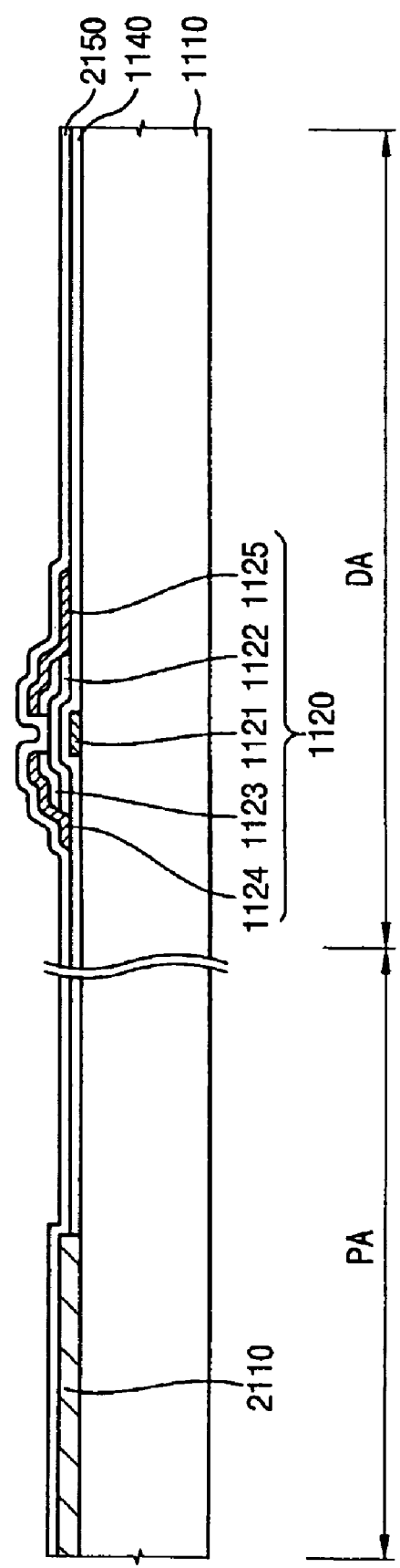
FIGS. 12 to 14 are cross-sectional views showing a method of manufacturing the lower substrate shown in FIG. 11.
Figure 13:
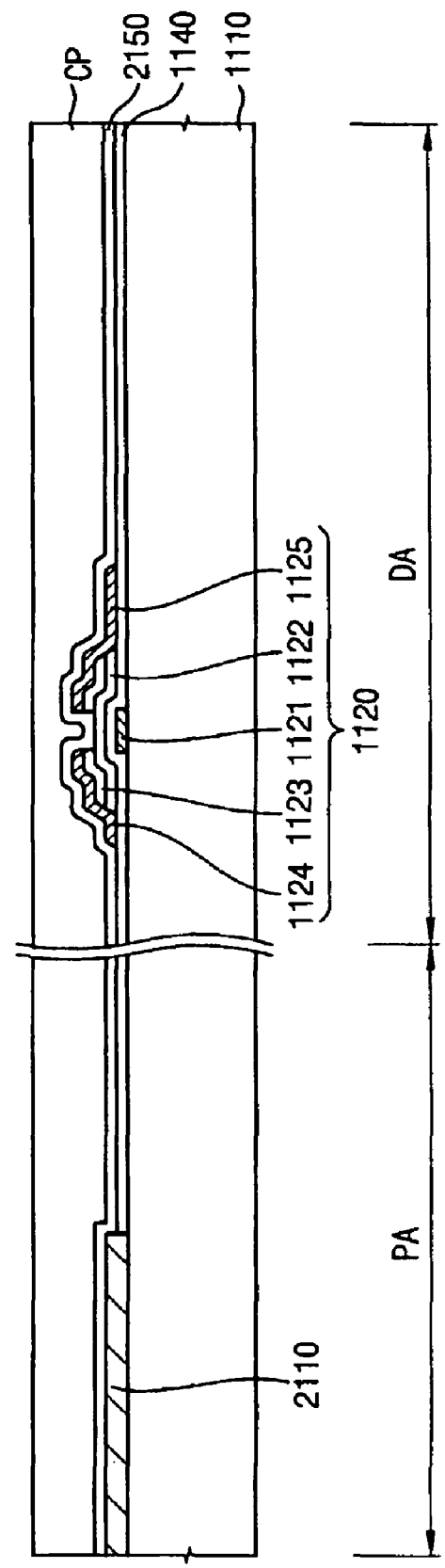
Figure 14:
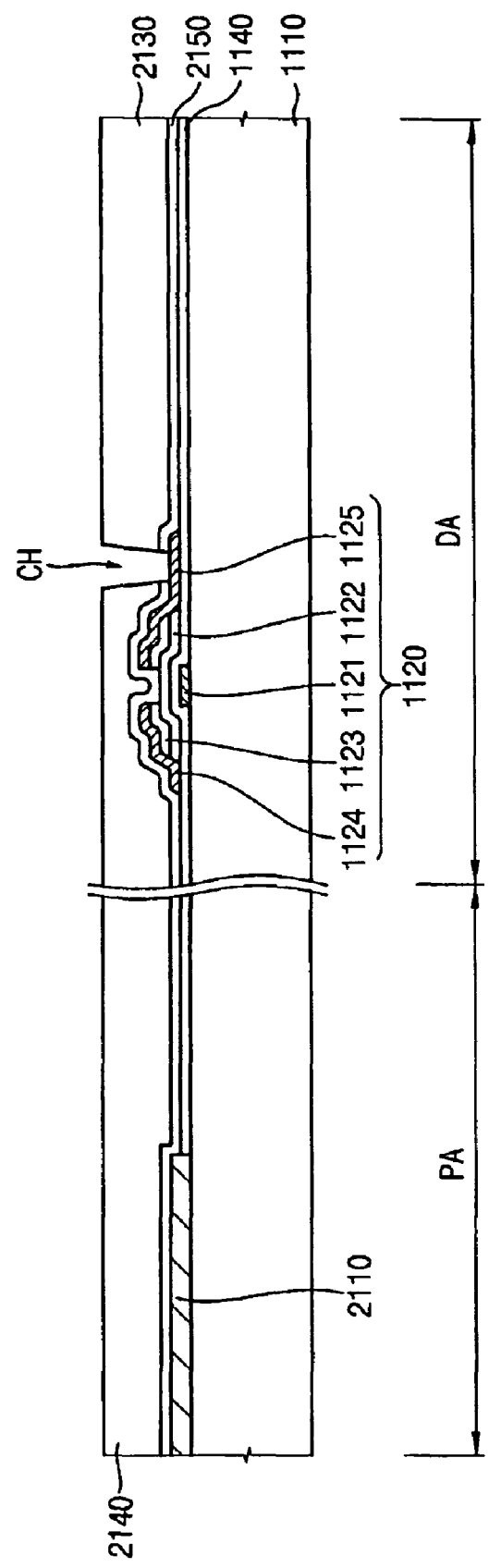

FIGS. 12 to 14 are cross-sectional views showing a method of manufacturing the lower substrate 2100 shown in FIG. 11.

Referring to FIG. 12, the TFT 1120 is formed in the display region DA of the first base substrate 1110. The first gate driving part 2110 is formed on the first base substrate 1110 in the peripheral region PA. In FIG. 12, the TFT 1120 is simultaneously formed with the first gate driving part 2110 according to an embodiment of the present invention.

The second gate driving part 2120 (shown in FIG. 8) may be simultaneously formed with the first gate driving part 2110. The gate lines GL1, . . . GLn (shown in FIG. 9) and the data lines DL1, . . . DLm (shown in FIG. 9) may be simultaneously formed with the TFT 1120.

The protecting layer 2150 is formed on the first base substrate 1110 to cover the TFT 1120 and the first gate driving part 2110.

Referring to FIG. 13, the color layer CP is formed on the protecting layer 2150. The color layer CP is patterned to form one of the red, green and blue color filters of the first color filter layer 2130 and the second color filter layer 2140.

The color layer CP includes substantially the same material as one of the red, green and blue color filters. Forming and patterning the color layer CP are repeated to form the first color filter layer 2130 including the red, green and blue color filters.

Referring to FIG. 14, the first color filter layer 2130 and the protecting layer 2150 are partially removed to form the contact hole CH. Referring again to FIG. 11, the pixel electrode 1130 is formed on the first color filter layer 2130. Therefore, the lower substrate 2100 is completed.

Figure 15:
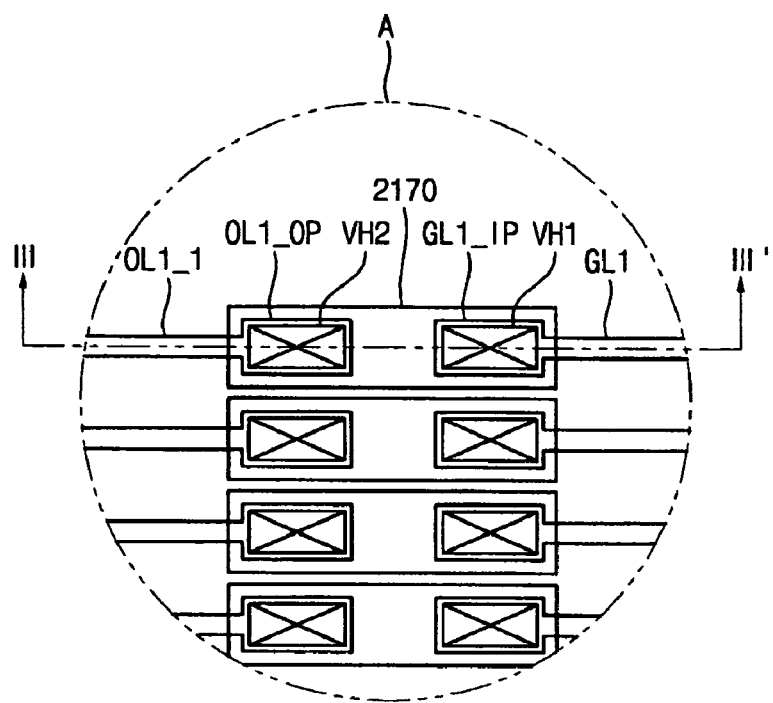
FIG. 15 is an enlarged plan view showing the portion 'A' shown in FIG. 9.

FIG. 15 is an enlarged plan view showing the portion 'A' shown in FIG. 9.

Referring to FIGS. 9 and 15, the lower substrate 2100 may further include a first output part that is electrically connected to the first gate driving part 2110. The first output part is in the peripheral region PA of the first base substrate 1110, and transmits the gate signals that are generated from the first gate driving part 2110.

The first output part includes a plurality of output lines OL1_1, . . . OL1_p that are electrically connected to the gate lines GL1, . . . GLn, respectively. Here, p is a natural number.

The output lines OL1_1, . . . OL1_p have substantially the same structure and the connected gate lines GL1, . . . GLn have substantially the same structure. Hereinafter, a first output line OL1_1 is described as one example of the output lines OL1_1, . . . OL1_p. In addition, a relationship between the first output line OL1_1 and the first gate line GL1 is one example of the relationships between the output lines OL1_1, . . . OL1_p and the gate lines GL1, . . . GLn.

Figure 16:
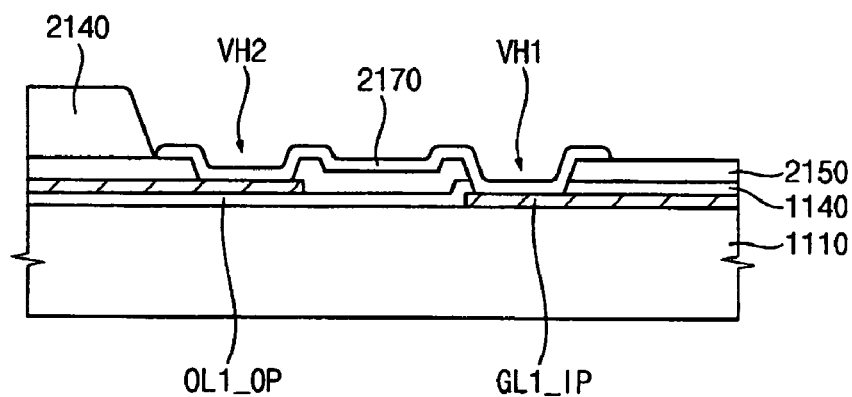
FIG. 16 is a cross-sectional view taken along the line III-III' shown in FIG. 15.

FIG. 16 is a cross-sectional view taken along the line III-III' shown in FIG. 15.

Referring to FIGS. 15 and 16, the first output line OL1_1 is formed on the gate insulating layer 1140. The protecting layer 2150 is formed on the first output line OL1_1 to cover the first output line OL1_1. The first output line OL1_1 is formed on an end portion of the first output pad OLL_OP.

A first input pad GL1_IP is formed on an end portion of the first gate line GL1. The first input pad GL1_IP is formed in the peripheral region PA. The first gate line GL1 is formed under the gate insulating layer 1140. Therefore, the first output line OL1_1 and the first gate line GL1 are formed on different layers from each other.

The gate insulating layer 1140 and the protecting layer 2150 are partially removed to form a first via hole VH1 through which the first input pad GL1_IP of the first gate line GL1 is partially exposed.

The protecting layer 2150 may further include a second via hole VH2 through which the first output pad OL1_OP of the first output line OL1_1 is exposed.

The lower substrate 2100 may further include a first electrode layer 2170 that is electrically connected between the first gate line GL1 and the first output line OL1_1. In FIG. 15, a plurality of first electrode layers 2170 are electrically connected between the first to n-th gate lines GL1, . . . GLn and the first to p-th output lines OL1_1, . . . OL1_p.

The first electrode layer 2170 is formed on the protecting layer 2150, and includes a transparent conductive material. The first electrode layer 2170 is formed through substantially the same process as the pixel electrode 1130 (shown in FIG. 9). The first electrode layer 2170 may be simultaneously formed with the pixel electrode 1130.

The first electrode layer 2170 is electrically connected to the first gate line GL1 through the first via hole VH1, and electrically connected to the first output line OL1_1 through the second via hole VH2. Therefore, the first output line OL1 is electrically connected to the first gate line GL1 through the first electrode layer 2170 so that the first gate signal is applied to the first gate line GL1 through the first output line OL1 and the first electrode layer 2170.

The second color filter layer 2140 corresponding to the first electrode layer 2170 is partially removed. That is, the second color filter 2140 is formed on a region except a portion that corresponds to the first electrode layer 2170. When the second color filter layer 2140 is formed on the first output pad OL1_OP and the first input pad GL1_IP, the first and second via holes VH1 and VH2 have a steep profile. In FIG. 16, the second color filter layer 2140 corresponding to the first electrode layer 2170 is partially removed so that the depth of the first and second via holes VH1 and VH2 is decreased.

Therefore, contact characteristics between the first electrode layer 2170 and the first output pad OL1_OP and between the first electrode layer 2170 and the first input pad GL1_IP are improved so that the first gate line GL1 is securely connected to the first output line OL1_1. In FIG. 16, the second color filter layer 2140 between the gate pads of the first to n-th gate lines GL1, . . . GLn and the output pads of the first to p-th output lines OL1_1, . . . OL1_p is partially removed. The second color filter 2140 is formed on a region except a portion between the gate pads of the first to n-th gate lines GL1, . . . GLn and the output pads of the first to p-th output lines OL1_1, . . . OL1_p.

Referring again to FIGS. 8 and 9, the lower substrate 2100 may further include a second output part that is electrically connected to the second gate driving part 2120. The second output part is formed in the peripheral region PA of the first base substrate 1110, and transmits gate signals generated from the second gate driving part 2120.

The second output part includes a plurality of gate output lines OL2_1, OL2_q that are electrically connected to the gate lines GL1, . . . GLn, respectively. Here, q is a natural number.

In FIGS. 8 and 9, the gate output lines OL2_1, . . . OL2_q have substantially the same structure as the output lines OL1_1, . . . OL1_p. In addition, connected gate output lines OL2_1, . . . OL2_q have substantially the same structure as the connected output lines OL1_1, . . . OL1_p.

Figure 17:
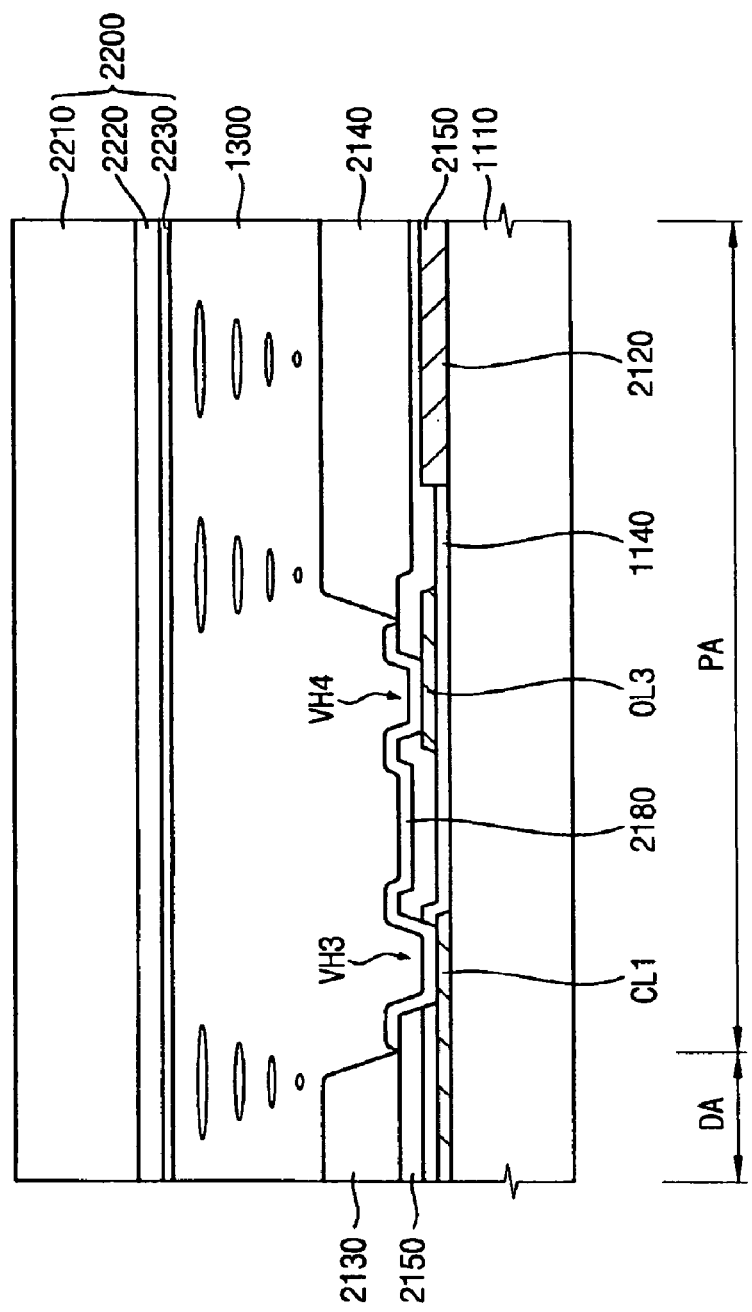
FIG. 17 is a cross-sectional view taken along the line IV-IV' shown in FIG. 8.

FIG. 17 is a cross-sectional view taken along the line IV-IV' shown in FIG. 8.

Referring to FIGS. 8 and 17, the lower substrate 2100 may further include a plurality of common electrode lines CL1, . . . CLn on the first base substrate 1110, and a third output part OL3 on the first base substrate 1110. The third output part OL3 applies the common voltage to the common electrode lines CL1, . . . CLn.

The common electrode lines CL1, . . . CLn are extended in the first direction D1, and arranged in the second direction D2. The common electrode lines CL1, . . . CLn are formed in the display region DA and the peripheral region PA. End portions of the common electrode lines CL1, . . . CLn are electrically connected to the third output part OL3 to receive the common voltage.

The common electrode lines CL1, . . . CLn are electrically connected to the common electrode 2230 (shown in FIG. 17) of the upper substrate 2200. The common voltage is applied to the common electrode 2230 through the common electrode lines CL1, . . . CLn.

The third output part OL3 is formed in the peripheral region PA of the first base substrate 1110, and is adjacent to the display region DA. The third output part OL3 is electrically connected to the driving chip 2300 to receive the common voltage from the driving chip 2300.

The common electrode lines CL1, . . . CLn have substantially the same structure, and connected structures between the third output part OL3 and the common electrode lines CL1, . . . CLn are substantially the same. Hereinafter, a connected structure between a first common electrode line CL1 and the third output part OL3 is described as one example of the connected structures between the common electrode lines CL1, . . . CLn and the third output part OL3.

Referring to FIGS. 8 and 17, the first common electrode line CL1 is formed on the first base substrate 1110, and formed from the same layer as the gate lines GL1, . . . GLn. An end portion of the first common electrode line CL1 is positioned in the peripheral region PA.

The gate insulating layer 1140 is formed on the first base substrate 1110 including the first common electrode line CL1.

The third output part OL3 is formed on the gate insulating layer 1140, and the protecting layer 2150 is formed on the gate insulating layer 1140 including the third output part OL3. The third output part OL3 and the first common electrode line CL1 are formed on different layers from each other.

The third output part OL3 is electrically connected to the first common electrode line CL1 through a third via hole VH3 and a fourth via hole VH4.

The third and fourth via holes VH3 and VH4 are formed in the peripheral region PA, and are adjacent to each other. The gate insulating layer 1140 and the protecting layer 2150 are partially removed to form the third via hole VH3 through which the end portion of the first common electrode line CL1 is exposed. The protecting layer 2150 is partially removed to form the fourth via hole VH4 through which the third output OL3 is partially exposed.

The lower substrate 2100 may further include a second electrode layer 2180. The third output part OL3 is electrically connected to the first common electrode line CL1 through the second electrode layer 2180.

The second electrode layer 2180 is formed in the peripheral region PA of the protecting layer 2150. The second electrode layer 2180 has substantially the same material as the first electrode layer 2170 (shown in FIG. 15). The second electrode layer 2180 is formed through substantially the same process as the first electrode layer 2170. The second electrode layer 2180 is electrically connected to the first common electrode line CL1 through the third via hole VH3. The second electrode layer 2180 is electrically connected to the third output part OL3 through the fourth via hole VH4. The second electrode layer 2180 is extended from the third via hole VH3 toward the fourth via hole VH4. Therefore, the first common electrode line CL1 is electrically connected to the third output part OL3 through the second electrode layer 2180.

The second color filter layer 2140 corresponding to the second electrode layer 2180 between the first common electrode line CL1 and the third output part OL3 is removed so that the first common electrode line CL1 is securely connected to the third output part OL3 through the second electrode layer 2180. That is, the second color filter layer 2140 is formed on a region except a portion that corresponds to the second electrode layer 2180 between the first common electrode line CL1 and the third output part OL3.

Referring again to FIGS. 8 and 9, the lower substrate 2100 may further include a shorting bar 2160 to prevent an application of a static charge to the data lines DL1, . . . DLm.

The shorting bar 2160 is formed in the peripheral region PA of the first base substrate 1110. The shorting bar 2160 is positioned between the driving chip 2300 and the display region DA. That is, the shorting bar 2160 is adjacent to a source side 1114 of the first base substrate 1110. The source side 1114 corresponds to end portions of the data lines DL1, . . . DLm.

Figure 18:
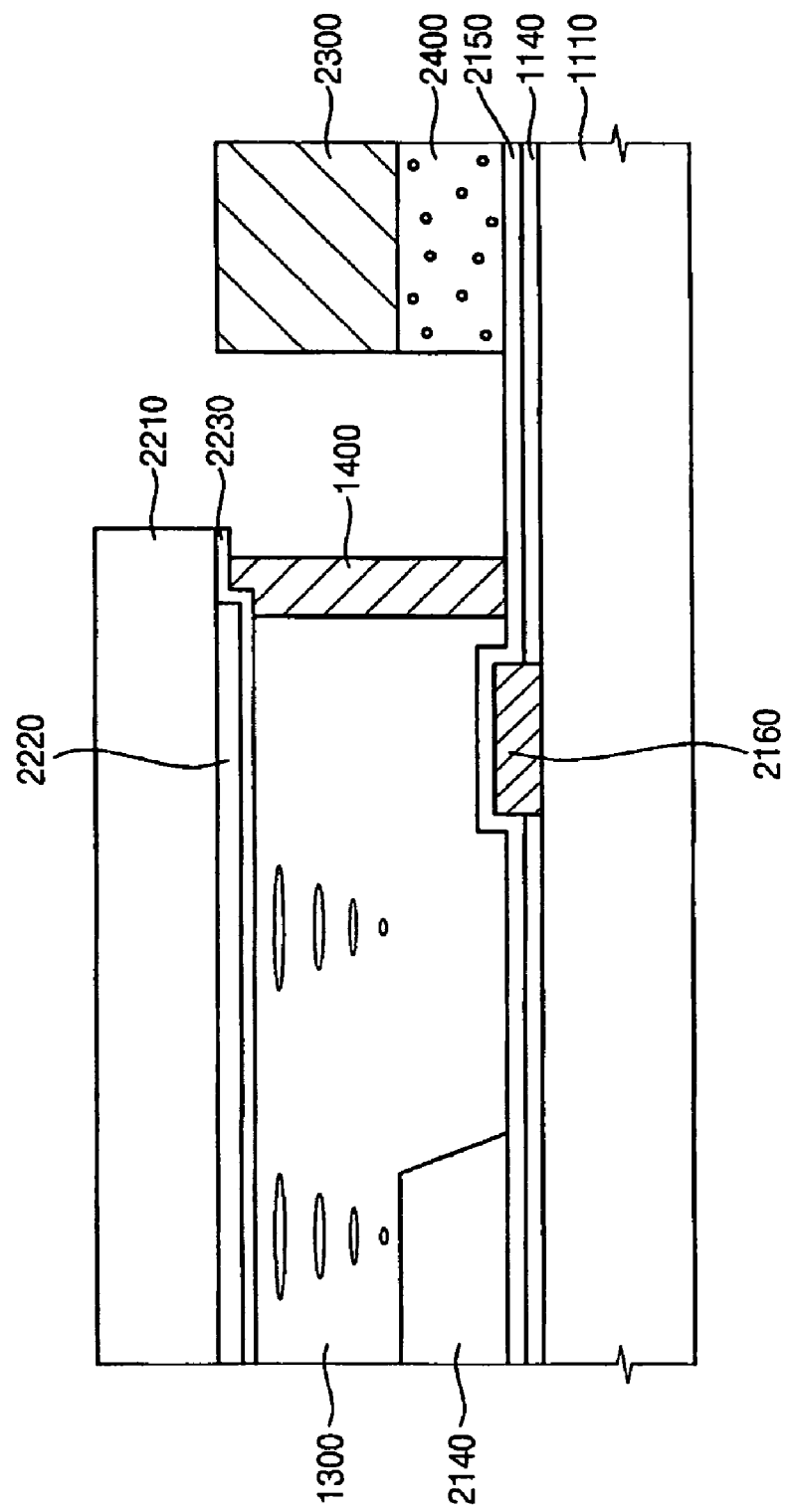
FIG. 18 is a cross-sectional view taken along the line V-V' shown in FIG. 8.

FIG. 18 is a cross-sectional view taken along the line V-V' shown in FIG. 8.

Referring to FIGS. 8 and 18, the LCD device may further include a sealant 1400 that combines the lower substrate 2100 and the upper substrate 2200 so that the liquid crystal layer 1300 is interposed between the lower substrate 2100 and the upper substrate 2200.

The shorting bar 2160 is formed in a region where the liquid crystal layer 1300 is positioned. The first and second color filter layers 2130 and 2140 that are extended toward the peripheral region PA are spaced apart from the shorting bar 2160.

The shorting bar 2160 may further include a first electrode (not shown) and a second electrode (not shown). The first electrode is under the gate insulating layer 1140, and the second electrode is on the gate insulating layer 1140. The first and second electrodes are electrically connected to each other through a third electrode (not shown). The first, second and third electrodes form substantially the same connecting structure as the gate lines GL1, . . . GLn and the first output part. The first and second color filter layers 2130 and 2140 corresponding to the third electrode between the first and second electrodes are removed so that the first electrode is securely connected to the second electrode through the third electrode. That is, the first and second color filter layers 2130 and 2140 are formed on a region except a portion that corresponds to the third electrode between the first and second electrodes.

The LCD device 2000 may further include an anisotropic conductive film (ACF) 2400. The driving chip 2300 is attached to the lower substrate 2100 through the ACF 2400. The ACF 2400 is interposed between the lower substrate 2100 and the driving chip 2300 so that the lower substrate 2100 is electrically connected to the driving chip 2300.

According to embodiments of the present invention, the LCD device includes a lower substrate having a first color filter layer in a display region, and a second color filter layer in a peripheral region. The lower substrate includes the first and second color filter layers in the display region and the peripheral region to decrease the height difference between the display region and the peripheral region and the cell gap difference between the display region and the peripheral region. Therefore, the LCD device has a uniform light transmittance to prevent a stripe line, thereby improving the image display quality.

In addition, according to embodiments of the present invention, the second color filter layer is formed on the first and second gate driving parts so that the first and second gate driving parts are electrically insulated from the common electrode. Therefore, a short circuit in the peripheral region between the lower and upper substrates is prevented.

Although preferred embodiments have been described herein with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. A display substrate comprising:
    a substrate divided into a display region and a peripheral region that surrounds the display region, wherein an image is displayed in the display region;
    a thin film transistor formed in the display region of the substrate;
    a first color filter layer formed on the substrate including the thin film transistor, wherein the first color filter layer is formed in the display region;
    a second color filter layer formed in the peripheral region of the substrate;
    an organic layer formed in the display region and the peripheral region to cover the first and second color filter layers;
    a pixel electrode formed on the organic layer in an area corresponding to the first color filter layer; and
    a seal line disposed on the organic layer between the first and second color filter layers,
    wherein a height of the organic layer formed across an entire region between the first and second color filter layers is higher than that of the first color filter layer and that of the second color filter layer.

2. The display substrate of claim 1, wherein the first color filter layer is spaced apart from the second color filter layer.

3. The display substrate of claim 2, wherein the second color filter layer includes a rod shape.

4. The display substrate of claim 3, wherein the second color filter layer surrounds the display region.

5. The display substrate of claim 4, wherein the second color filter layer comprises at least two second color filter portions spaced apart from each other.

6. The display substrate of claim 1, wherein an end portion of the first color filter layer is extended from the display region toward the peripheral region.

7. The display substrate of claim 6, wherein the extended end portion of the first color filter layer extends to an area of the peripheral region to correspond to the second color filter layer formed on an opposite side of the peripheral region with respect to the display region.

8. The display substrate of claim 1, wherein the second color filter layer is integrally formed with the first color filter layer.

* * * * *